(12) United States Patent
Schleith et al.

(10) Patent No.: US 12,235,828 B2
(45) Date of Patent: Feb. 25, 2025

(54) SYSTEMS AND METHODS FOR DETECTION AND CORRECTION OF ANOMALIES PRIORITY

(71) Applicant: Thomson Reuters Enterprise Centre GmbH, Zug (CH)

(72) Inventors: Johannes Schleith, London (GB); Brian Kent Cechmanek, London (GB); Revogatus Apolinary Tesha, Cambridge, MA (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 0 days.

(21) Appl. No.: 18/083,469

(22) Filed: Dec. 16, 2022

(65) Prior Publication Data

US 2023/0195715 A1   Jun. 22, 2023

Related U.S. Application Data

(60) Provisional application No. 63/290,105, filed on Dec. 16, 2021.

(51) Int. Cl.
| | | |
|---|---|---|
| *G06F 16/00* | (2019.01) | |
| *G06F 16/23* | (2019.01) | |
| *G06F 16/28* | (2019.01) | |

(52) U.S. Cl.
CPC ........ *G06F 16/2365* (2019.01); *G06F 16/285* (2019.01)

(58) Field of Classification Search
CPC .............. G06F 11/079; G06F 11/3006; G06F 11/3452; G06F 16/258; G06F 16/9024; G06F 18/2433; G06F 11/0709; G06F 11/0751; G06F 11/3409; G06F 11/0772; G06F 11/302; G06F 11/321; G06F 11/3476; G06F 16/2455; G06F 16/24575; G06F 16/904; G06F 16/906; G06F 16/903; G06F 16/907; G06F 16/93; G06F 17/00;
(Continued)

(56) References Cited

U.S. PATENT DOCUMENTS

| | | | |
|---|---|---|---|
| 2017/0017537 A1 | 1/2017 | Razin et al. | |
| 2017/0132068 A1* | 5/2017 | Parra .................. | G06F 11/0793 |

(Continued)

OTHER PUBLICATIONS

Patent Cooperation Treaty, International Search Report and Written Opinion issued for PCT Application No. PCT/US2022/081887, dated Mar. 30, 2023, 10 pages.

*Primary Examiner* — Shyue Jiunn Hwa
(74) *Attorney, Agent, or Firm* — Norton Rose Fulbright US LLP

(57) ABSTRACT

Embodiments of the present disclosure support systems and methods providing functionality for performing anomaly detection and remediation. In an aspect, a dataset comprising transaction data stored in a plurality of data sources is obtained. One or more clustering algorithms are executed against the dataset to identify a plurality of clusters. At least one cluster of the plurality of clusters corresponds to a portion of the dataset comprising an anomaly. A classifier may be used to determine a cause of the anomaly and one or more actions to eliminate the anomaly may be initiated. Data derived from the dataset subsequent to the one or more actions may be output. For example, the output may be a report generated based on the dataset.

12 Claims, 6 Drawing Sheets

(58) Field of Classification Search
CPC .......... G06F 18/00; G06F 18/10; G06F 18/20; G06F 18/22; G06F 18/23; G06F 18/24323; G06F 18/24765; G06F 18/26; G06F 16/285; G06F 16/24578; G06F 16/254; G06F 16/444; G06F 3/0482; G06F 3/0484; G06F 3/04842; G06F 3/04847; G06F 40/134; G06F 11/0793; G06F 11/34; G06F 11/3428; G06F 2201/87; G06F 18/24; G06F 18/24133; G06F 40/20; G06F 40/279; G06F 16/283; H04L 41/145; H04L 41/22; H04L 43/00; H04L 43/045; G06N 20/00; G06N 5/04
See application file for complete search history.

(56) References Cited

U.S. PATENT DOCUMENTS

| | | |
|---|---|---|
| 2017/0277582 A1 | 9/2017 | Chen et al. |
| 2020/0005096 A1 | 1/2020 | Calmon et al. |
| 2020/0272731 A1* | 8/2020 | Jaenisch ............ H04L 63/1425 |
| 2020/0379868 A1 | 12/2020 | Dherange et al. |
| 2020/0394455 A1 | 12/2020 | Lee et al. |
| 2021/0034994 A1* | 2/2021 | Stocker .................... G06N 5/04 |
| 2021/0200612 A1* | 7/2021 | Martyanov ............ G06F 40/279 |

* cited by examiner

| ReportName | Count |
|---|---|
| Box Number Report - Detailed Version | 632 |
| 1 Specs - Box 1-9 Report | 320 |
| Box Number Report - Detailed Version (new) | 266 |
| Box Number Report with Source Tax Code | 220 |
| Tax Rate Discrepancies | 214 |
| Box Number Report with Additional Fields | 212 |
| Box Number Report | 202 |

FIG. 4

SYSTEMS AND METHODS FOR DETECTION AND CORRECTION OF ANOMALIES

PRIORITY

PRIORITY

The present application claims the benefit of and priority to U.S. Provisional Application No. 63/290,105, filed Dec. 16, 2021 and entitled "SYSTEMS AND METHODS FOR ANOMALY DETECTION", the content of which is incorporated herein by reference in its entirety.

TECHNICAL FIELD

The present disclosure relates to mitigation of anomalies in datasets and more specifically, to systems and methods for detection of anomalies, causes of anomalies, and correction of anomalies in datasets.

BACKGROUND

Detection of anomalies in datasets is a challenging technical problem. For example, datasets can include data in different formats, data can be missing or input incorrectly, errors can occur during import and/or export of data between different formats, systems, and/or applications, and the impact or significance of the data may vary by geographic region. Each of these different issues presents a different set of challenges with respect to anomaly detection. For example, detection of missing data represents a different set of challenges as compared to errors in data or detection of an anomaly in data of a first format may be insufficient for detecting the same anomaly in data of a second format.

As can be appreciated from the foregoing, using a rules-based approach, as is currently used, may result in an inability to perform comprehensive anomaly detection, resulting in datasets being used with potentially incomplete or incorrect data that may negatively impact use of the dataset(s). For example, rules-based techniques are currently used to perform anomaly detection across many different use cases. Such rules-based techniques may require creation of a large number of rules and require a deep understanding of the data, systems, applications, and uses that may be impacted by the presence of anomalies in a dataset. Even when created by a domain or subject matter expert having the requisite understanding, rules may fail to provide comprehensive detection of anomalies, especially where the dataset involves geographically distributed processes that may be subjected to different legal and regulatory requirements, which may change frequently as laws and regulations are created and/or changed. Additionally, certain types of anomalies may be difficult, if not impossible, to detect using a rules-based approach, such as anomalies that cannot be bounded by simple thresholds or detected using keyword or term matching. Accordingly, existing anomaly detection techniques are insufficient to provide comprehensive anomaly detection.

SUMMARY

Embodiments of the present disclosure provide systems, methods, and computer-readable storage media supporting operations to detect anomalies in a dataset and remediate the anomalies. The disclosed anomaly detection techniques may include obtaining a dataset. Information of the dataset may be stored in one or a plurality of data sources and may include transaction data. Where the data is obtained from a plurality of data sources, the plurality of data sources may store portions of the dataset in a non-standardized format dependent on the hardware and software associated with each data source, and embodiments may include converting information of the dataset to a standardized format, such as a format to facilitate anomaly detection operations in accordance with the concepts disclosed herein.

Once the dataset is obtained, one or more clustering algorithms against the dataset to identify a plurality of clusters. At least one cluster of the plurality of clusters may corresponds to a portion of the dataset comprising an anomaly. In an aspect, the clustering may be performed using multiple clustering algorithms, where each clustering algorithm of the plurality of clustering algorithms may be configured to detect at least one type of anomaly within the dataset. In an aspect, each clustering algorithm of the plurality of clustering algorithms may be configured to detect a different type of anomaly within the dataset. In an aspect, the clustering may be performed using an active dataset and a historic dataset, where the historic dataset provides a baseline or reference dataset and the active dataset corresponds to a dataset in which anomaly detection is desired. Utilizing the clustering algorithms may enable anomalies to be detected in the active dataset based on identification of outlier data as compared to the historic dataset. In an additional or alternative aspect, anomalies may be detected based on variance analysis performed with respect to at least a portion of the dataset. Additionally or alternatively, embodiments may be used to predict expected values to be derived from a dataset obtained in the future and those predictions may be used to detect anomalies (e.g. based on differences between the predicted values and actual values obtained from the dataset obtained in the future).

When an anomaly is detected, embodiments may initiate one or more actions to eliminate the anomaly or anomalies. In an aspect, once clusters associated with anomalies are detected, a classification algorithm may be applied to the anomaly-based clusters to determine a cause (or causes) of the anomaly. The one or more actions to eliminate the anomaly or anomalies may be determined based on the causes output by the classification algorithm(s). Subsequent to addressing the anomalies via the one or more actions, data derived from the dataset may be output. For example, the output data may be a report that includes information from the dataset or information derived from the dataset. In an aspect, mapping data may be used to map portions of the dataset to data fields of the report, and the data fields may be populated with values corresponding to the mapped portions of the dataset.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF DRAWINGS

For a more complete understanding of the present disclosure, reference is now made to the following descriptions taken in conjunction with the accompanying drawings, in which:

FIG. 4 shows a screenshot of an exemplary report that may be used for anomaly detection in accordance with aspects of the present disclosure;

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Figure 1:
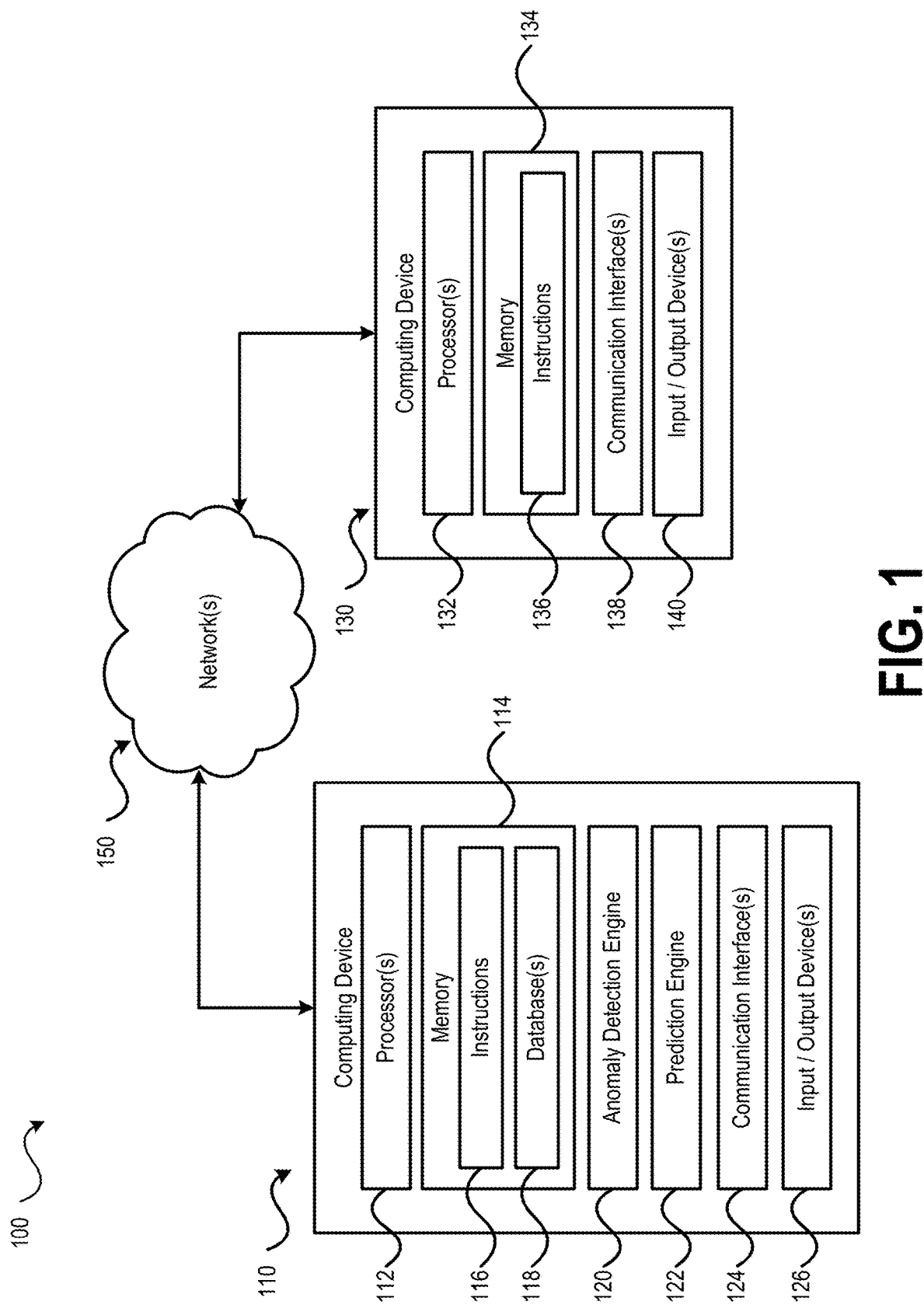
FIG. 1 shows a block diagram of an anomaly mitigation system in accordance with aspects of the present disclosure.

Referring to FIG. 1, a block diagram of an anomaly mitigation system in accordance with aspects of the present disclosure is shown as a system 100. As described in more detail below, the system 100 is configured to identify anomalies in datasets using artificial intelligence-based fuzzy detection techniques that provide for high detection of anomalies, and is also configured to provide functionality to correct the detected anomalies, thereby minimizing or eliminating the presence of anomalies within datasets. In an aspect, the system 100 may also provide functionality for generating documents based on cleaned datasets (e.g., datasets after correction of detected anomalies), which may include processing of a portion of the dataset and associating the portion of the dataset with a portion of a document (e.g., a particular field or set of fields). Exemplary details regarding the above-identified functionality of the system 100 are described in more detail below.

As illustrated in FIG. 1, the system 100 includes a computing device 110 that includes one or more processors 112, a memory 114, an anomaly detection engine 120, one or more communication interfaces 122, and input/output (I/O) devices 124. The one or more processors 112 include a central processing unit (CPU), graphics processing unit (GPU), a microprocessor, a controller, a microcontroller, a plurality of microprocessors, an application-specific integrated circuit (ASIC), an application-specific standard product (ASSP), or any combination thereof. The memory 114 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. The memory 114 may also store instructions 116 that, when executed by the one or more processors 112, cause the one or more processors 112 to perform operations described herein with respect to the functionality of the computing device 110 and the system 100.

The communication interface(s) 122 may be configured to communicatively couple the computing device 110 to the one or more networks 150 via wired or wireless communication links according to one or more communication protocols or standards. The I/O devices 124 may include one or more display devices, a keyboard, a stylus, one or more touchscreens, a mouse, a trackpad, a camera, one or more speakers, haptic feedback devices, or other types of devices that enable a user to receive information from or provide information to the computing device 110.

The one or more database 118 may be configured to store one or more datasets that may be analyzed for anomalies. As a non-limiting and illustrative example, a dataset of transactions may include transactions occurring over a period of time, such as transactions completed over the past day, week, month, 3 months, 6 months, a year, and so on. Each transaction of the dataset may include various pieces of information, such as date information (e.g., a date the transaction was executed, a shipping date, a received date, or other date information associated with the transaction), value information (e.g., a monetary value of the transaction, a monetary cost associated with the transaction, etc.), information identifying one or more entities (e.g., a seller and a buyer, one or more shipping service providers, etc.), information descriptive of the transaction (e.g., purchase of information technology (IT) equipment, etc.), location information (e.g., information associated with the locations of the entities involved in the transaction, a point of origin for one or more goods or services involved in the transaction, etc.), or other types of information.

Figure 2:
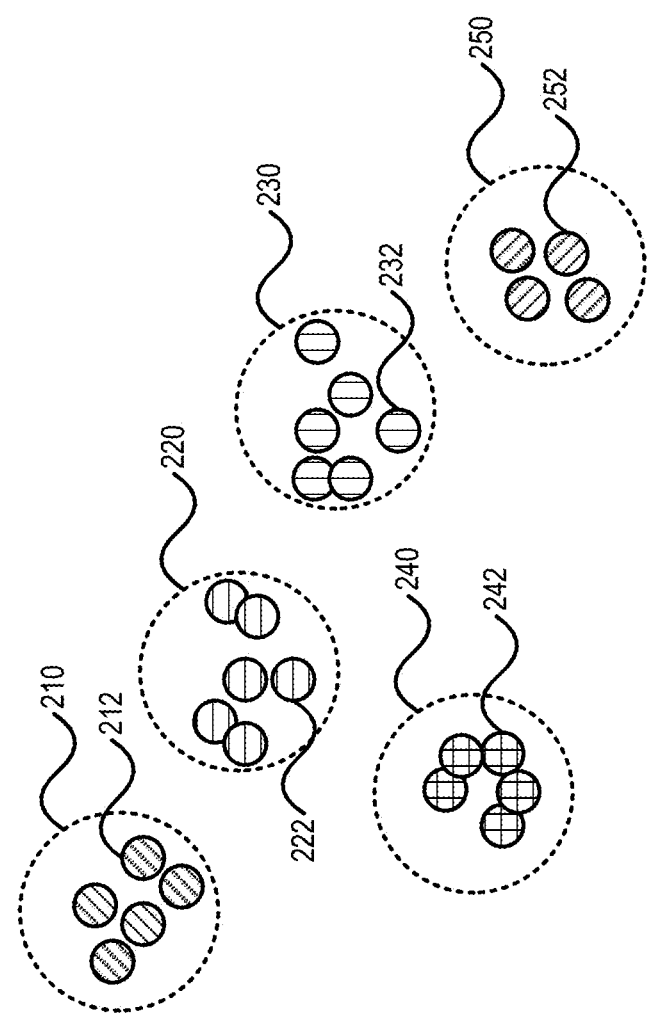
FIG. 2 shows a block diagram illustrating an exemplary technique for detecting anomalies in a dataset in accordance with aspects of the present disclosure.

The anomaly detection engine 120 may be configured to utilize clustering techniques to detect anomalous transactions in the above-described dataset of transactions. For example, the anomaly detection engine 120 may be configured to apply one or more clustering algorithms to the dataset to identify anomalous transactions within the dataset. It is noted that anomalous transactions may not necessarily be invalid or incorrect transactions and may instead include transactions that appear to be unusual. As an example and referring to FIG. 2, a block diagram illustrating an exemplary technique for detecting anomalies in a dataset in accordance with aspects of the present disclosure is shown. In FIG. 2, an exemplary dataset including transactions 212, 222, 232, 242, 252 is shown. A clustering algorithm may be applied (e.g., by the anomaly detection engine 120 of FIG. 1) to the dataset to identify anomalies within the dataset. For example, the clustering algorithm may generate multiple clusters 210, 220, 230, 240, 250, each including a set of transactions from the dataset. Each of the clusters 210, 220, 230, 240, 250 may include transactions sharing similarities with respect to one or more transaction features (e.g., one or more of the exemplary transaction features described above or other features). For example, the transactions may be clustered according to a single feature, such as an amount or value of the transaction, or multiple features, such as an amount or value of the transaction and the entities involved in the transaction. It is noted that other features and/or combinations of features could be used to configure how the transactions of the dataset are clustered for performing anomaly detection.

As a non-limiting example, anomalies in transaction datasets that may be detected (e.g., by the computing device 110 and the anomaly detection engine 120 of FIG. 1) using the above-described clustering techniques may include: duplicated values (e.g., repeated transactions, which may have been duplicated in error); incorrect tax codes (e.g., transaction for the same product or service but applying different tax codes, which could be correct if a product can fall into multiple categories, but is undesirable); unusual values and/or sudden changes in values (e.g., $10,000 instead of a $1,000 due to a typographical error during data input); high-impact transactions (e.g., transactions associated with a tax amount exceeding a particular value); balances that keep growing past dates they are supposed to be claimed; recurring refunds or 0 tax return; returns that are not being filed for one or more months; fully reclaimed amounts in countries where it should never happen (as per legislation); paying larger sums of value added tax (VAT) to the same vendor; difference between input (transaction data) and output amounts (e.g. at time of filing or preparing return); unusual dates/values (e.g., wrong date formats); incorrect or missing tax rates; other anomalies; or combinations of the above-identified anomalies. It is noted that in addition to identifying anomalies, the functionality of the computing device 110 may also be used to identify other irregularities or errors in datasets or processes used to generate the datasets. For example, an anomaly may occur due to incorrect tax code and tax rate mappings used to associate a particular transaction with an applicable tax rate or code, an unusual tax rate for a country (e.g., a tax rate that is not commonly used may be incorrectly associated with a transaction or omitted inadvertently), a missing invoice identifier, datatypes being configured as strings instead of numerical or number values, missing/gaps in data, or other reasons. When anomalies are identified within a dataset, causation analysis may be performed to identify the cause of the anomaly, such as to determine whether there is a problem with tax code/tax rate mappings, data types, or other parameters for processes used to generate the datasets, or whether the anomalies are merely the result of data entry errors. Where anomalies are caused by incorrect process configurations, modifications to the process configurations may be made to mitigate future occurrences of the anomalies, at least with respect to the "fixed" causes-however, there may be other causes of the anomalies that may require other types of modifications or corrections to be made.

As an illustrative example, suppose the clustering algorithm used to generate the clusters of FIG. 2 is configured to perform clustering based on one or more first features of the transactions. In such an implementation, the cluster 210 may include transactions 212 sharing similarities with respect to the one or more first features, the cluster 220 may include transactions 222 sharing similarities with respect to the one or more first features, the cluster 230 may include transactions 232 sharing similarities with respect to the one or more first features, the cluster 240 may include transactions 242 sharing similarities with respect to the one or more first features, and the cluster 250 may include transactions 252 sharing similarities with respect to the one or more first features. While each of the clusters 210-250 includes transactions sharing similarities with respect to other transactions within each cluster, the transactions associated with different clusters may be different with respect to the one or more first features. One of the clusters, such as cluster 250, may include transactions identified as anomalies.

In an aspect, the clustering may be performed using an active dataset (i.e., a current dataset or dataset having new information) and a historic dataset (e.g., information from prior datasets). In such an implementation, the clustering algorithm may be configured to form clusters by associating transactions from the active dataset with transactions of the historic dataset having similar features, and the anomalous transactions may be identified based on the cluster(s) that only include transactions from the active dataset (i.e., transactions of the active dataset that are not similar to transactions of the historic dataset) and/or the cluster(s) having a threshold percentage of transactions from the active dataset (e.g., anomalies may be detected where a cluster includes more than X percent (e.g., 25%, 40%, 50%, 60%, 75%, etc.) transactions from the active dataset). For example, a cluster that includes only (or a particular percentage) transactions from the active dataset may indicate anomalous transactions because such a cluster includes transactions from the active dataset that are dissimilar to the transactions of the historic dataset. It is noted that while FIG. 2 shows the clustering algorithm producing 5 clusters (e.g., the clusters 210-250), the clustering algorithm(s) utilized in accordance with the present disclosure may be configured to generate less than 5 clusters (e.g., 2 clusters, 3 clusters, 4 clusters) or more than 5 clusters depending on the particular features used for clustering and the types of anomalies to be detected.

Referring back to FIG. 1, the anomaly detection engine 120 may be configured to utilize different clustering algorithms to perform anomaly detection in accordance with aspects of the present disclosure. For example, a first clustering algorithm may be utilized to identify or detect a first type of anomaly, while a second clustering algorithm may be utilized to identify a second type of anomaly, where the first and second anomalies are different. As a non-limiting example, the anomaly detection algorithm may utilize a k-means clustering algorithm, a k-nearest neighbors (KNN) clustering algorithm, a centroid-based clustering algorithm, distribution-based clustering algorithms, or other algorithms and techniques. It should also be understood that more than two clustering algorithms may be utilized to perform clustering depending on the number of anomalies to be detected and the types of features in the dataset (e.g., certain features may be more efficiently clustered using one clustering technique as compared to another clustering technique). As a non-limiting example, a first clustering algorithm may be utilized to identify anomalies associated with a tax rate or tax code applicable to the transaction and a second clustering algorithm may be utilized to identify anomalies associated with transaction values that appear abnormal. It is noted that any number of anomalies may be identified using the clustering techniques described above by appropriate configuration of clustering algorithms, such as to configure the features of the dataset used to perform the clustering.

In an aspect, anomalies identified using clustering may be validated using additional analysis techniques. For example, an anomaly may be present or not present depending on a time of an event and/or a location where the event occurred. To illustrate, a banking transaction or other type of transaction may be considered normal or not an anomaly if the transaction occurs on a weekday in some or all countries, but may be considered an anomaly in one or more countries if the transaction occurs on a weekend. In such instances where clustering is used to identify anomalous transactions, once the set of potentially anomalous transaction are identified (e.g., using clustering techniques as described above), further analysis may be performed on each transaction in the potentially anomalous transactions of the cluster to perform location-based and/or time-based anomaly detection and validation. That is, data identified by a clustering algorithm as containing potential anomalies may be verified using location-based techniques (e.g., is the transaction anomalous given the location where the transaction or event occurred), time-based techniques (e.g., is the transaction anomalous given a time the transaction or event occurred), or both location-based and time-based techniques (e.g., is a transaction anomalous given where the transaction occurred and a time when the transaction occurred). Other validation techniques may also be used to refine and/or validate identification of anomalous data within a dataset and time-based and location-based techniques have been described above for purposes of illustration, rather than by way of limitation.

It is noted that while the examples above have focused on the use of clustering algorithms, other techniques may also be utilized by the anomaly detection engine 120 to detect anomalies. For example, certain types of datasets (or portions of datasets) may be subjected to trendline analysis to predict anomalies. In trendline analysis the anomaly detection engine 120 may analyze the dataset(s) or portion thereof to identify one or more trendlines in the dataset. Once defined, the trendline may be used to detect anomalies in certain types of data, such as recurring values or transactions. For example, recurring or consecutive values of a set of time series data (e.g., periodic transactions) may be compared to the trendline to detect values that keep repeating and/or keep increasing sharply or accumulating steadily. To detect anomalies transactions of the dataset may be compared to the trendline and ones that do not follow the trendline may be identified as anomalies. Using trendline analysis may be advantageous for identifying anomalies in certain types of data, such as time-series data, where anomalies may need to account for temporal differences in the dataset. In an aspect, the trendline analysis may utilize a historical dataset or a portion of the historic dataset. For example, the trendline analysis may use a last n values to determine the trendline, such as the last n values prior to the active dataset, or may determine the trendline(s) using the active dataset only (or a combination of the historic and active datasets). Such a trendline analysis technique may provide a mechanism or technique for identifying anomalies that is cost-efficient (e.g., from a computational resources perspective). The trendline technique also provides an easy to explain and easy to understand technique for identifying anomalies that may operate dynamically (e.g., the trendline may provide a sliding window with respect to variance analysis) to account for changes in the dataset over time. It is noted that trendline analysis may be particular well suited for certain types of anomalies, such as recurring or duplicate transactions, unusual or sudden changes in values, balances that continue to grow past expected claim dates, reclaimed amount in countries where such transactions are not permitted, and differences between inputs and reportings (e.g., at a time of filing or generating a report or other document based on the dataset).

In addition to clustering and use of trendline analysis, the anomaly detection engine 120 may also utilize autoencoders/matrix completion techniques. For example, a full matrix may be constructed from transaction data using an autoencoder and then values may be removed from the matrix. Once the values are removed, matrix completion techniques should be able to predict the removed values if the data is normal (i.e., not an anomaly). Once matrix completion is performed the portions of the matrix reconstructed for the removed values may be compared to the removed values to determine whether the reconstructed portions are sufficiently similar to the removed values, where significant differences between the reconstructed and omitted values may indicate anomalies. This technique may be sensitive to anomaly fraction in the dataset, providing a technique for anomaly detection that is suitable for detecting a variety of anomalies, such as wrong tax codes, unusual values or sudden changes in values, balances that continue to grow past expected claim dates, reclaimed amount in countries where such transactions are not permitted, and differences between inputs and reportings (e.g., at time of filing or generation of a report), and the like.

Another anomaly detection technique that may be utilized by the anomaly detection engine 120 is Bayesian (networks) and machine learning based regression. To illustrate, for each new observation x of feature X, find the probability (P), which may be expressed as P (X=x or a <x>b given everything else), which may be determined, at least in part based on known data, such as the historic dataset described above. In addition to finding P, the anomaly detection engine 120 may also determine confidence intervals for each P. An x may indicate a potential anomaly where the probability low, which indicates a low probability confidence. When an anomaly is identified it may be flagged for investigation by a user. If the user actually decides x is normal, the distribution of P (X given everything else) gets updated to understand this situation so that it is not flagged as an anomaly in the future or becomes less likely to be flagged as an anomaly (e.g., the first time it is indicated as normal the probability may be updated may be below a confidence interval sufficient to avoid flagging as potential anomaly, but as it is flagged and identified as normal in the future the confidence interval increases to the point it is no longer flagged as an anomaly). Machine learning-based regression could be performed in a similar manner. However, the advantage of using Bayesian networks is the ability to generate distributions from smaller sample sizes, thereby requiring less historic data.

In an aspect, the anomaly detection engine 120 may also use joint probability distribution analysis to identify anomalies. For example, in a transaction a singular value (e.g., amount, location, entity, etc.) may not appear anomalous, but looking at combinations of these values and their join probability distributions may enable anomalies to be detected. For example, suppose two features, X and Y, had the following known values:

| X | Y |
|---|---|
| 10 | 120 |
| 30 | 150 |
| 15 | 100 |

In such a scenario, X=30 and Y=150 on their own may not look anomalous since both are known values for X and Y, but the joint distribution of both X and Y could show the data point as an outlier (e.g., the probability that X is 30 and Y is 150 is anomalous). The conditional probability techniques described above may be particularly well suited to detect anomalies with respect to expected values and reported values. For example, considering transactions involving a specific tax code, the conditional probability technique described above may be able to quickly look at expected tax reported relative to historic tax reported tax to detect outliers. The probabilistic techniques described above may also be well-suited for other types of analysis as well.

The above-described anomaly detection techniques provide several advantages over existing techniques for identifying anomalies in transaction datasets. For example, the above-described techniques are not rule based, and are therefore not limited with respect to the types of anomalies that can be identified (i.e., rule-based techniques are only capable of identifying anomalies fitting a particular rule). Furthermore, the above-described techniques do not require an understanding of underlying data (e.g., no need to understand the transaction)—instead, the above-described techniques operate based on analysis of features of transactions, such as detecting transactions having features that stick out as being dissimilar to prior transactions. This allows the anomaly detection engine 120 to be used to identify anomalies on other types of data, including non-transaction data, while retaining the ability to detect anomalies in an efficient manner. Additionally, the above-identified anomaly detection techniques reduce a volume of verification that need to be performed when working with transaction datasets. For example, the anomaly detection techniques enable analysis to be performed only on those transactions where anomalies are identified, rather than needing to check every transaction, as is currently required.

In an aspect, the anomaly detection engine 120 may be configured to pre-process information of the dataset(s) prior to performing clustering or another anomaly detection technique. For example, the dataset may initially include personally identifiable information (PII data) and the pre-processing may be configured to abstract, remove, or anonymize the PII data (e.g., replace the PII data with dummy values) for purposes of performing identification of anomalies within the dataset. It is noted that while certain information of the dataset may be extraneous with respect to aspects of anomaly detection, such as the personal identification portion of the information, PII data may not be completely irrelevant. For example, an anomalous transaction may be identified where a customer is not identified or a location of the customer is one of a set of specific locations (e.g., locations where regulations or restrictions are imposed on the transaction). Thus, for some transactions the PII data may be masked or anonymized such that relevant portions of the transaction remain present for purposes of anomaly detection while portions of the PII data that are not relevant to an applied anomaly detection technique may be removed.

As another example, the dataset may initially be in a first format (e.g., a document format, such as an invoice) and may be converted to a second format (e.g., a tabular format, such as a spreadsheet) prior to performing anomaly detection processing. In such an example, the conversion of the data to the second format may be used to more efficiently perform anomaly detection (e.g., reduce computational resources and memory, faster processing, etc.). To illustrate, a clustering algorithm may be executed against a dataset to perform anomaly detection, as described above. To reduce computational complexity associated with executing the clustering algorithm, a subset of the data (e.g., a subset including features relevant to a particular type of anomaly) may be provided to the clustering algorithm, thereby reducing the feature space upon which the clustering algorithm considers and enabling the algorithm to be executed more efficiently, both with respect to computational resources required and speed at which clustering can be performed. Furthermore, a conversion process may be performed at the time each transaction occurs or periodically (e.g., once per hour, day, etc.), thereby enabling the converted dataset to be available in a format suitable for use with the clustering algorithms or other anomaly detection techniques, which may enable anomaly detection to be performed in an ad hoc or on-demand manner. Furthermore, during the conversion process the dataset may be cleaned, such as to remove, obfuscate, anonymize, or abstract PII data or other information from the dataset, thereby reducing the feature space of the dataset used for anomaly detection and eliminating potential sources of noise that may reduce the accuracy of anomaly detection processes. It is noted that the exemplary pre-processing operations described above have been provided for purposes of illustration, rather than by way of limitation and that other types of pre-processing operations may also be utilized in accordance with the concepts described herein.

Using the above-described anomaly detection techniques enable the computing device 110 to identify anomalies in a dataset. In addition to anomaly detection, the computing device 110 may provide functionality for correction or mitigation of one or more anomalies. In an aspect, the correction or mitigation of anomalies may be performed automatically. For example, where an anomaly is detected, a classifier may be applied to the anomalous data (e.g., an anomalous transaction, data item, etc.) to classify a type of anomaly. To illustrate, the classifier may classify an item or anomalous data as relating to a VAT error, calculation errors, missing data anomalies, and the like. In an aspect, the classification may be based at least in part on the clusters described above. For example, the clustering may be configured to group transactions or other types of data based on features of the data (e.g., type of transaction, location, amount, date, tax information, etc.), which results in data items having similar features being grouped together (e.g., in a cluster).

A classifier may be applied to the clusters to associate each cluster with a type of anomaly. For example, the classifier may be trained using a dataset including transactions labeled with different types of anomalies. Through training the classifier using labelled data, the classifier learns how to identify likely categories associated with causes of anomalies, such as VAT anomalies, calculation anomalies, missing data anomalies, and the like. Once the anomalies are identified (e.g., in the active dataset), such as based on labels applied by a classifier as described above, the computing device 110 may initiate one or more actions to investigate and dispatch actions with respect to identified anomalies. It is noted that the investigation of anomalies and actions taken or dispatched with respect to anomalies may be performed manually, automatically, or a mixture of manual and automatic processes, as described below.

As a non-limiting example of a manual anomaly investigation process, information associated with identified anomalies may be provided from the computing device 110 to a computing device 130. As shown in FIG. 1, the computing device 130 includes one or more processors 132, a memory 134, one or more communication interfaces 138, and one or more I/O devices 140. The one or more processors 132 may includes one or more of the various types of processors described above with reference to the one or more processors 112 and the memory 134 may similarly include memory devices similar to those described above with reference to memory 114. The memory 134 may also store instructions 136 that, when executed by one or more processors, cause the one or more processors to perform operations described herein with reference to the computing 130 and other devices and functionality disclosed herein. The one or more communication interfaces 138 and I/O devices 140 of the computing device 130 may be similar to the communication interface(s) 124 and I/O devices 126 described above.

The computing device 130 may be associated with a user responsible for investigating and remediating identified anomalies to determine whether anomalies are the result of errors, or just unusual, but valid data. The information provided to the computing device 130 regarding data identified as anomalous by the computing device 110 may be presented (e.g., via a display device of the one or more I/O devices 140) to the user for review and may included the classification, transaction data, or other information associated with the data identified as containing an anomaly. The user may view the data and the classification to determine whether the data is valid or includes an error that needs to be corrected. It is noted that the computing device 130 may enable the user to investigate the anomalous data in various ways, including identifying and viewing similar types of data from historic (or known valid) data, reviewing metadata, identifying related data (e.g., the anomalous data may relate to a transaction and related data may be the parties to the transaction, the status of the transaction, confirmation of payment/receipt for any goods or services involved in the transaction, other types of information, etc.), or other techniques. In an aspect, the data sources from which the related information may be obtained may include the same data sources where the anomalous data resides, or may include additional data sources. For example, where the data identified as anomalous is a transaction, the related information may be obtained from a same transaction database or may include information from the same transaction database, other transaction databases, and non-transaction databases (e.g., a list of known valid customers, a list of known fraudulent customers, location information associated with high likelihood of anomalous activity (i.e., geographic regions associated with high likelihood of fraudulent or criminal activity), or other information sources. The user can view the anomalous data and the other data accessible via the computing device 130 to determine whether the data is anomalous or not, such as by verifying data input into the system is correct, verifying calculations in a data record, or other types of techniques. Once the user has completed the investigation, the user may provide and input to the computing device 130, which may transmit information to the computing device 110 regarding the outcome of the investigation, such as to mark the data as confirmed valid or confirmed anomalous.

In an aspect, some or all of the investigative concepts described above may be performed in an autonomous or semi-autonomous manner. For example, an artificial intelligence (AI) algorithm may be trained to analyze transaction data in view of the classification described above, which provides a predicted category for the cause(s) of the identified anomaly. As part of the analysis, the AI algorithm may evaluate certain features of the anomalous data to determine a cause of the anomaly, where the features are determined according to the category of anomaly indicated by the classification (e.g., when determining the cause of the anomaly for a transaction having features A, B, C, the AI algorithm may: evaluate features A and B for classification 1; evaluate features B and C for classification 2; evaluate features A and C for classification 3; or evaluate features A-C for classification 4). In a fully automated implementation, the AI algorithm may determine whether the data is an error or is otherwise valid data—in other words, whether remedial action needs to be taken to correct the data or not—and where corrections are needed, may determine the corrections based on the cause of the anomaly as determined by the AI algorithm. A few non-limiting examples of causes of anomalies are described below to provide some additional context on the exemplary operations described above for investigating and resolving anomalies in datasets, whether performed manually or using AI algorithms.

In an aspect, anomalies detected by the system 100 may include anomalies associated with a prepared tax return or data that may be used to prepare a tax return. In many modern systems, preparation of a tax return may be based on data from a variety of sources (e.g., enterprise resource planning systems, order managements system, inventory management systems, etc.), which may include many different databases and storage systems from which data must be retrieved and tied together during preparation of a tax return. In such circumstances, and as explained above, the different storage systems may have different formats, which could result in data import errors, whether import to the data source or from the data source to a tax return generation process, that are flagged as anomalies. Such errors may be detected using the AI algorithms described above, which may be trained to evaluate the metadata tied to the data on import rather than data in the individual tax returns (e.g., to determine whether a data type used for import of the data is a correct data type).

Another type of anomaly that could be detected and validated/verified is calculation errors. As a non-limiting example, a tax return generation process may link a data field of a tax return to one or more pieces of data in a dataset, where the data field is populated with a value calculated or populated from the one or more pieces of linked data. In such situations, an anomaly may occur if the data linked to the data field is incorrect due to mapping errors (e.g., the wrong data is linked to the data field), data entry errors (e.g., the data linked to the data field is correctly mapped, but is the wrong data. Additionally, anomalies may occur as the results of linked documents being inaccessible (e.g., due to issues related to access credentials, network access, database access, etc.), which may cause values to be missing when calculations are performed or data fields are populated. An AI algorithm may be trained to locate relevant data and verify that the relevant data was accounted for in any calculations or used to populate mapped/linked data field, thereby verifying all relevant data was actually and correctly applied when populating the data fields.

As noted above, anomalies detected in accordance with the concepts disclosed herein may represent errors that need to be corrected or may simply be unusual values. Where the anomalies are determined (e.g., during anomaly investigation and validation) to merely be unusual values, the data may be flagged or otherwise annotated to indicate the data is valid, thereby freeing the data from designation as an anomaly. However, if the anomaly is associated with an error, one or more actions to correct the error may be initiated. For example, where the anomaly is caused by missing data linked to a data field, the data field may be repopulated in a manner that accounts for the missing data. Where the missing data was previously not accounted for in a report, such as a tax return, the tax return may be regenerated with any missing values accounted for. Additionally, where a cause of the error was using incorrect data (e.g., a mapping error or data entry error resulting in use of incorrect data), the mapping of the data and/or the data itself may be corrected to include the correct information and/or mapping, after which the report (e.g., tax return, a forecast report, etc.) may be generated or updated.

In addition to detection of anomalies and their causes, as described above, embodiments of the present disclosure may also be configured to provide information about the meaning or causes of anomalies. For example, where an anomaly is determined to be caused by a mapping error, a message or prompt may be provided to a user or recorded in a database (e.g., one of the one or more databases 118) that indicates an anomaly was detected with "X" due to a mapping error, where "X" could be a process (e.g., a data import process for populating data fields using data stored in one or more data sources according to mapping data), data (e.g., mapping data, such as to indicate mapping data for field "A" of a form incorrect due to type mismatch or other reasons), network issues (e.g., data unavailable from resource "B" due to network connectivity issues), or other reasons. Determining the cause of the anomaly and recording the cause in a record of a database (e.g., an anomaly detection log or database) may enable refinement of the AI algorithms and machine learning processes described above, such as by using the anomaly and causation data to train the AI algorithms and machine learning processes to distinguish between anomalies and potentially non-anomalous causes (e.g., distinguishing between anomalies caused by mapping errors or missing data errors and anomalies caused by network issues).

Furthermore, where a cause of an anomaly is likely to be a false alarm (e.g., likely network issue), the anomaly detection processes may be trained to provide prompts to a user to correct the cause of the potential or possible anomaly, such as to verify network connectivity. After restoring or establishing network activity, the anomaly detection process may be re-evaluated to determine whether the problem persists, which may indicate a mapping error or missing data error, or may confirm the previously detected anomaly was a false alarm (e.g., because the anomaly is not detected after establishing network connectivity. As can be appreciated from the foregoing, training AI algorithms and machine learning processes to provide feedback regarding causes of detected anomalies may enable the anomaly detection process to be improved, such as by reducing the number of false alarm anomalies detected or designing processes to correct causes of pseudo-anomalies (e.g., anomalies caused by infrastructure issues, such as network connectivity) on the fly, enabling mitigation or remediation of those pseudo-anomalies to be completed more quickly.

In addition to anomaly detection and mitigation, the computing device 110 may provide additional functionality for supporting operations of the system 100. For example, the prediction engine 122 may provide functionality for performing variance analysis and forecasting operations. For example, variance analysis may include comparing performance metrics for a current time period to performance metrics for one or more prior time periods. For example, the current time period and the one or more prior time periods could be designated in months (e.g., one or more previous months relative to a current month, one or more months of a prior year relative to the same month(s) in a current year (year-over-year analysis), or other period of time designations (e.g., days, weeks, quarters, years, etc.). During variance analysis the prediction engine 122 may determine how data of the current time period varies or differs as compared to the data of the prior time period. As a non-limiting example, for an organization involved in the sale of goods or services or the purchase of goods or services, information associated with the sale and/or purchase of goods and services may be used to calculate an amount of tax due (e.g., sales tax, VAT, etc.) to a government agency. The variance analysis may seek to identify differences between current and prior time periods that vary by some target difference (e.g., a threshold percentage, such as 10%, 20%, 25%, 30%, and so on, or a threshold amount, such as "X" dollars). When a variance is identified as satisfying the target difference (i.e., the variance is greater than or greater than or equal to the target difference), an anomaly may be detected and may be flagged for manual or automated investigation.

It is noted that variance analysis may be based on various types of data, such as a number of transactions (e.g., variances in the number transactions that occurred during a period of time), tax due (e.g., variances in the tax to be paid based on transactions during a period of time), tax paid (e.g., variances in the tax paid for transactions during a period of time), tax codes (e.g., variances in the tax codes applied to transactions during a period of time), data fields of a form (e.g., the number of changes made to a form over a period of time), or other factors or features that may be extracted from system data. It is noted that in addition to using variance analysis for anomaly detection, variance analysis may also be used for reporting performance of an organization or sub-unit thereof (e.g., a division, a business unit, a salesperson, etc.). For example, such reporting functionality provided by the prediction engine 122 may be used to generate reports indicating performance or growth on a regional basis, such as by showing variance by quarter (e.g., performance or growth is going up or down over time), by market segment (e.g., a report indicating whether exports to France are going up or down), or forecasting reports (e.g., if variance year-over-year (or monthly, quarterly, etc.) indicates average growth of 5%, predict future performance and associated data, such as predicted tax/sales/etc., for a future time period. Such variance analysis and forecasting capabilities provided by the prediction engine 122 may provide a different type of analysis an analysis that looks at an organization or sector of the organization from a macro perspective across time, rather than a micro perspective as in the analysis provided by the anomaly detection engine 120. Such forecasting capabilities may enable an organization to plan future allocation of resources (e.g., inventory resources, monetary resources, etc.) to streamline and optimize performance over the period of time corresponding to the predicted forecast period.

The above-described anomaly detection, variance, and forecasting techniques provide for improved detection of anomalies and other insights from datasets, especially "dirty" datasets. For example, multi-national companies source data from many different systems and applications, internal and external data sources (e.g., databases, websites, users, etc.), and other sources of information. Many of these data sources may be maintained in siloed units of an organization, and may utilize on different hardware and/or software platforms to generate and output data in a format specific to the hardware and/or software platforms of a given organizational unit. These different hardware and/or software platforms may store data in a non-standard format selected by or configured according to whichever hardware or software platform is being used, making it difficult for the organization as a whole to share this information or update other units within the organization with newly acquired information. This can lead to problems with managing various operations across an enterprise or organization as a whole, since data at various units of the organization may be incompatible with respect to formats or other factors. As a result of the challenges mentioned above, existing approaches to anomaly detection, which often rely on a user's subjective understanding and expertise with respect to a data domain, are fraught with errors. As a non-limiting example, when evaluating a tax return to validate certain types of tax information, such as VAT, existing approaches rely on a user to observe the data in the various fields and based on their experience reviewing tax returns, identify portions of the return that appear off and warrant investigation to verify the data associated with those portions of the return.

In contrast, the anomaly detection engine 120, alone or in combination with the operations and functionality of the prediction engine 122, can autonomously analyze a dataset, such as a dataset used to generate a tax return, to identify anomalous data (e.g., including data input into one or more fields of the tax return or data upon which the tax return was generated). Moreover, unlike existing approaches that rely on subject matter expertise, the techniques disclosed herein do not rely on techniques that require and understanding of the data and instead use techniques capable of identifying anomalies without requiring understanding of the datasets under consideration. This is because the disclosed techniques detect anomalies based on identification of data that is an outlier or dissimilar to other data in the dataset through clustering techniques, thereby enabling anomalies to be detected in a dataset irrespective of the data involved, whether it be transaction data, tax return data, energy consumption data, or metrics associated with performance of an engine or other components of a vehicle or a fleet of vehicles. Moreover, the above-described functionality of the computing device 110 provides processes for converting data in different formats to a standardized format that is suitable for or enables analysis of datasets that include data from different systems, applications, and other data sources to be analyzed using the disclosed anomaly detection, variance, and prediction/forecasting techniques. Moreover, the disclosed techniques enable identification of causes of anomalies to be identified, thereby enabling incorrect configurations at data sources (e.g., incorrect data types, linkage of data to report fields, etc.) or missing data to be corrected, thereby eliminating anomalies and preventing their reoccurrence. As can be appreciated from the foregoing, the functionality provided by the computing device 110 of FIG. 1 represents an improvement to anomaly detection systems and techniques and enables processes involving analysis or use of data across disparate systems and data sources to be handled in a consistent manner despite being stored in different formats at each of those different systems and data sources.

Figure 3:
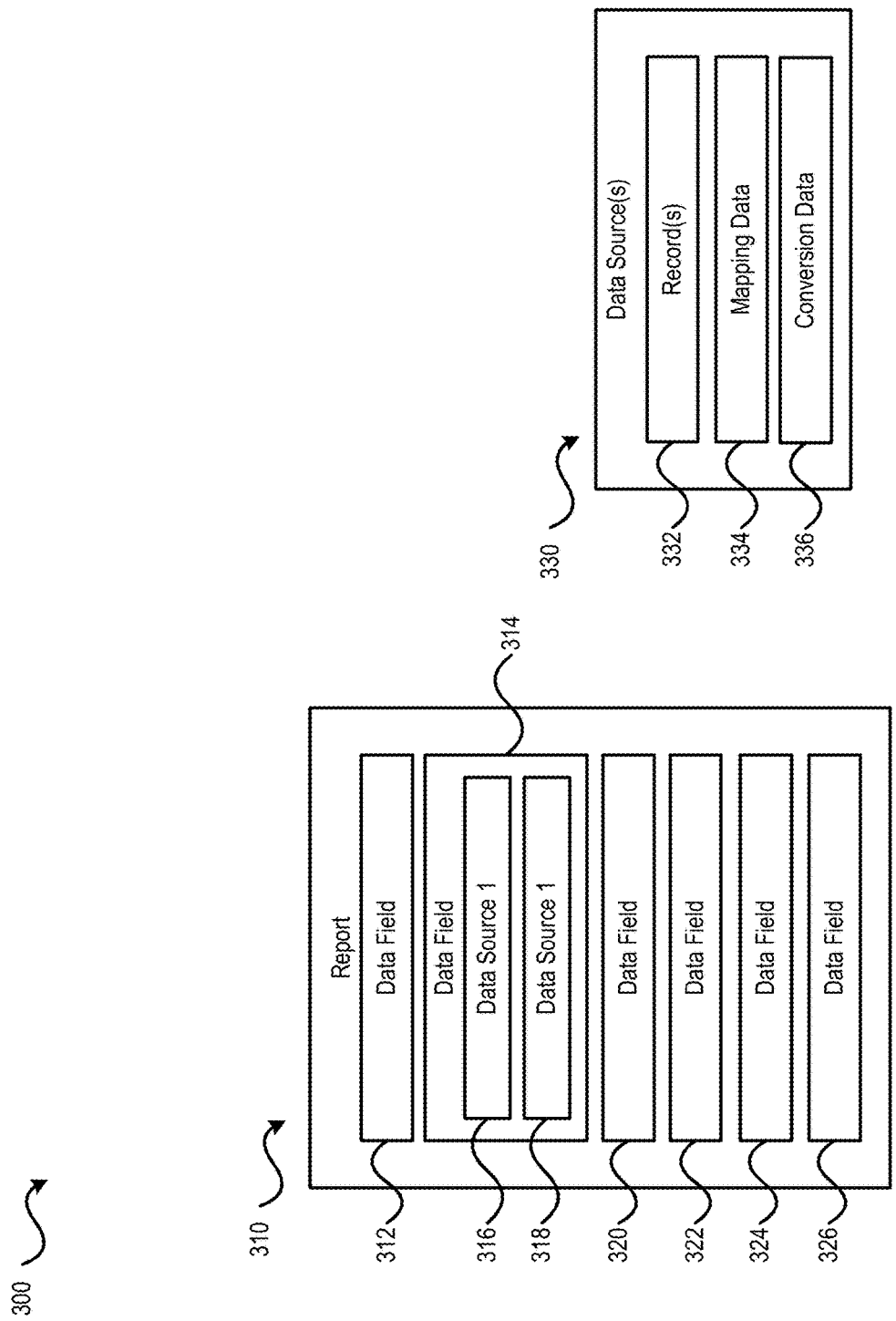
FIG. 3 is a block diagram illustrating exemplary operations for generating a report in accordance with aspects of the present disclosure.

Referring to FIG. 3, a block diagram illustrating exemplary operations for generating a report in accordance with aspects of the present disclosure are shown. As described above, the anomaly detection techniques of the present disclosure enable anomalies to be detected within datasets (e.g., based on analysis of the data of the datasets), but may also be utilized to identify anomalies in other types of information derived from datasets. In the example of FIG. 3, a report 310 is shown and includes data fields 312, 314, 320, 322, 324, 326. Each of the data fields of the report 310 may include information, and at least some of the data fields may include information derived from or stored in one or more data sources 330. For example, data field 314 is shown as including information derived from different pieces of information 316, 318 obtained from at least one data source of the data source(s) 330. For example, information 316, 318 may be obtained from records 332 of one or more databases, such as a database of transactions. In an aspect, the database(s) may be one of the one or more databases 118 of FIG. 1. In an aspect, the information in data field 314 of the report 310 may be information calculated based on the information 316, 318. Additionally or alternatively, the information in data field 314 of the report 310 may simply be the information 316, 318, such as a tax code and tax amount. Regardless of the manner in which the data fields of the report 310 are populated, an anomaly detection process in accordance with aspects of the present disclosure may be utilized to analyze the report for anomalies using the above-described techniques.

For example, the information included in each of the data fields 312, 314, 320, 322, 324, 326 may be subjected to one or more clustering algorithms, each of the one or more clustering algorithms designed to identify different types of anomalies. In an aspect, the clustering algorithm(s) may utilize historic data, such as historic instances of the report 310 (e.g., reports generated during one or more prior periods of time), to detect anomalies. When an anomaly is detected based on the clustering, additional analysis may be performed to verify the indication that an anomaly is present. For example, time-based, location-based, or time- and location-based analysis may be performed to determine whether anomalies are present when considering a time of an event (e.g., a transaction) represented by information associated with one of the data fields, when considering a location of an event (e.g., a transaction) represented by information associated with one of the data fields, or a combination of both the time and location of the event represented by information associated with one of the data fields. If an anomaly is verified using the time- and/or location-based techniques, a warning may be raised to indicate that an anomaly has been detected.

As another example, where the anomaly is based on derived data, such as information generated based on two or more different pieces of information (e.g., information 316, 318), mapping data 334 may accessed to determine the source(s) of the information used to populate the data field and those source of information may be consulted to verify the derived data recorded to the data field. To illustrate, the mapping data 334 may map different ones of the records 332 to fields of the report 310. The mapping data 334 may also identify types of data that may be accepted by the data fields of the report, such as string data, numeric data (e.g., integer data, floating point data, etc.), or other types of information that may be used to access the records 332 to obtain data for populating the data fields of the report. As a non-limiting example, the data field 314 may represent a VAT tax amount on a tax return and the mapping data 334 may identify a set of records 332 corresponding to transactions for which VAT tax applies and one or more records identifying a tax rate or rates associated with the transactions. During anomaly detection, the mapping data may be used to identify the transactions and the corresponding tax rates and the VAT tax amount represented by the data field 314 may be calculated to verify whether the data field 314 has been properly configured. In an aspect, the calculation of the VAT tax amount may be performed selectively. For example, if a clustering algorithm determines the data field 314 appears to contain an anomaly, the calculation of the VAT tax based on the mapping data as described above may be performed, but the calculating may not be performed if the data field 314 is not identified as containing a potential anomaly by the clustering algorithm. It is further noted that other techniques may be used to determine whether one or more fields of the report 310 contain anomalies. For example, variance analysis may be used to detect whether the value in data field 314 is an anomaly (e.g., if a VAT tax amount varies from prior VAT tax amounts by a threshold amount), or an anomaly may be identified if the value in data field 314 differs from a predicted value (e.g., a value predicted by the prediction engine 122) by a threshold amount.

In an aspect, the population of the data fields of the report 310 may be populated following a conversion process, as described above with reference to FIG. 1. For example, a database may store information about different various forms of data (e.g., transactions, tax codes, location data, etc.), data formats used at different locations, data indicating data types to be used to populate the report 310, or other types of information that may be used to convert data from different ones of the data sources 330 to a common format suitable for generating the report, as described above with reference to FIG. 1.

As another non-limiting example, the report 310 may be a general ledger (GL) Reconciliation Report that is used to compare a statement (e.g., a tax return, a sales report, etc.) against a general ledger of transactions. The GL Reconciliation Report may provide a "useful cross check" between different users of data, such as an office of information control (OIC) and an ERP data source. For example, an enterprise may have different sources of transaction data, which may be stored in different data bases or systems. While every transaction should be tagged by a tax code, in some instances transactions can be posted without tax codes, resulting in missing data in one or more data sources. However, such transactions, while not associated with a tax code, may be linked to a VAT control account. The GIL Reconciliation Report may be used to compare the amount of VAT paid or scheduled to be paid to the government matches the net amount in the VAT control account. Such an anomaly detection mechanism may be used to identify discrepancies between different data sources (e.g., the VAT control account and an ERP system), which may enable refinement of processes used to manage those data sources to eliminate such anomalies in the future.

In an aspect, the report 310 may be a box report that shows which transactions were used to calculate individual boxes in a tax return. Such as report may be used to identify causes of anomalies based on missing data, such as to which line items (e.g., transactions) are causing a box in the tax return to be unusually high or low. Such as report may be generated using the mapping data 334, which may provide information mapping transactions stored in the data records 332 to data fields of a tax return form, and may also use the conversion data 336 (e.g., to perform conversion of any data records 332 during generation or analysis of the box report). An exemplary box report is shown in FIG. 4, which includes two columns 402, 404, and a plurality of rows 410-412. Each row may correspond to one or more boxes (e.g., data fields) of a report (e.g., a tax return), where the column 402 identifies the portions of the report and the column 404 identifies the number of data records (e.g., transactions or records 332) used to calculate the value(s) included in the relevant boxes. It is noted that while the examples above have been described as being performed in preparation for submitting a report, such as a tax return, the above-described processes may also be performed for other purposes, such as to prove up a previously submitted report or identify issues with changes made subsequent to submitting the report (e.g., during an audit or amending the report).

It is noted that other types of reports may also be used to identify anomalies, such as a duplicate transactions report that lists transactions with identical transaction identifiers (IDs). It is noted that instead of using a duplicate transactions report, duplicate transactions may be identified using clustering techniques, such as by identifying multiple transactions having a distance of zero or that are less than some threshold from each other, signifying duplicate or near duplicate transactions.

In an aspect, a graphical user interface may be presented at a display device (e.g., a display device corresponding to the one or more I/O devices 140 of FIG. 1) to enable a user to view the report 310. The graphical user interface may be configured to display one or more warnings associated with identified anomalies. For example, where an anomaly is identified with respect to one of the data fields of the report 310, a warning may be displayed to indicate the data field(s) for which an anomaly has been detected. Furthermore, where an anomaly is detected, a classifier may be applied to determine a cause or likely cause of the anomaly, where the cause may be included in the warning. The user may interact with one or more interactive elements of the graphical user interface to investigate the anomaly, such as to verify whether an anomaly is, in fact, present or to review the cause of the anomaly. As an example, an anomaly may be caused by lack of network connectivity to a data source 330 during report generation, resulting in missing data. The warning displayed may indicate no network connectivity to the data source and the user may use the interactive elements of the graphical user interface to determine whether network connectivity to the data source is established. If network connectivity is not established, the user can reconnect to the data source and refresh the report, thereby eliminating the anomaly. It is noted that the warnings may identify other types of causes of anomalies and the graphical user interface may provide other interactive elements to enable the user to remediate and investigate any identified anomalies. Once all anomalies have been remediated, the user may then submit the report 310, which may include submitting the report to another user to verify before the report is submitted (e.g., to a government agency or other recipient) or submitting the report (directly) to a recipient (e.g., a government agency, other user, etc.).

Figure 5:
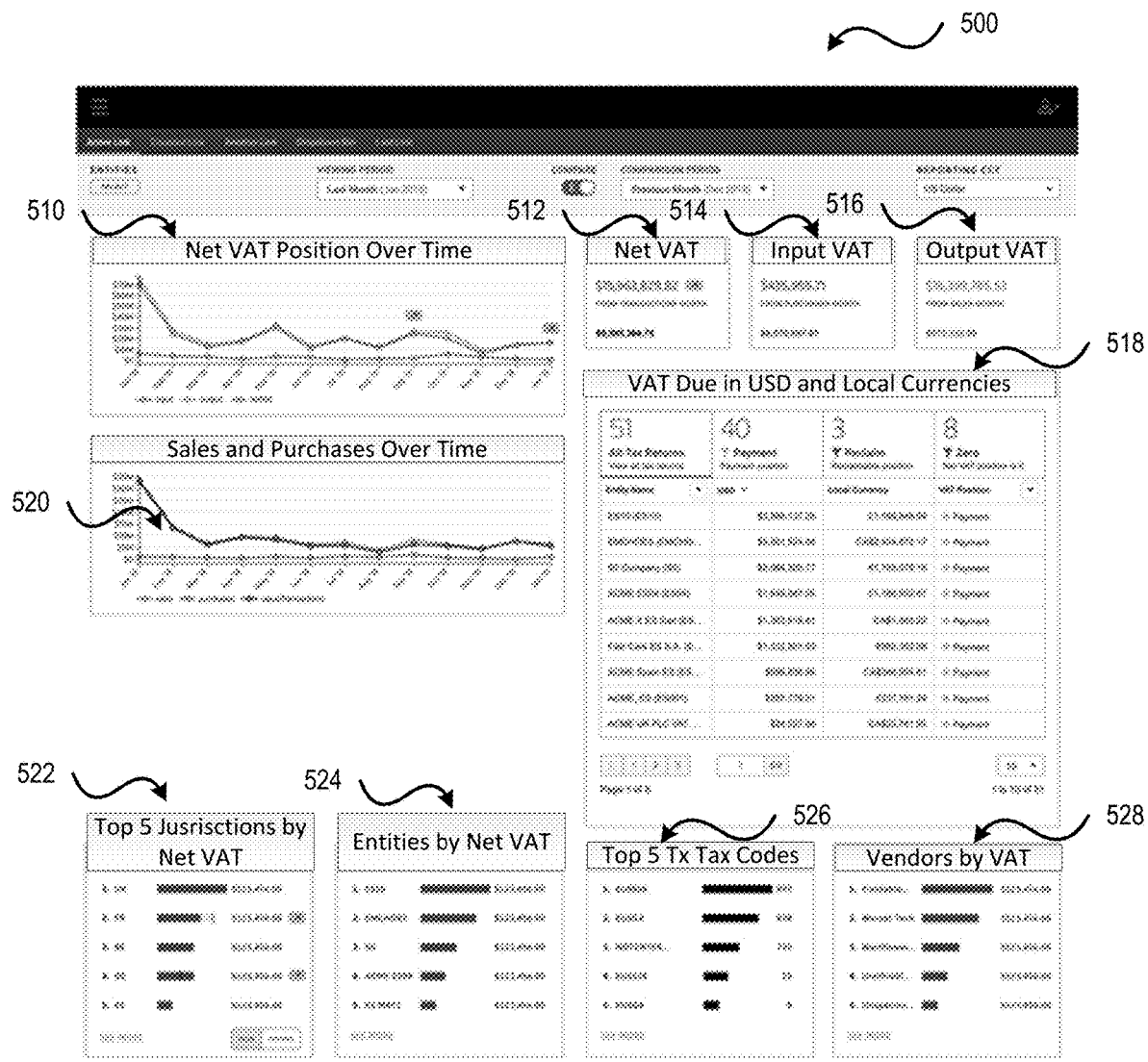
FIG. 5 is a screenshot of an exemplary interface for displaying information associated with anomaly detection processes in accordance with aspects of the present disclosure.

Referring to FIG. 5, a screenshot of an exemplary interface for displaying information associated with anomaly detection processes in accordance with aspects of the present disclosure is shown as an interface 500. As shown in FIG. 5, the interface 500 includes a variety of display regions 510, 512, 514, 516, 518, 520, 522, 524, 526, 528, each displaying different types of information associated with various types of analysis performed by an anomaly detection system, such as the anomaly detection system 100 of FIG. 1, in accordance with the concepts disclosed herein. For example, region 510 may display variance information for VAT over time, region 512 may display information for a current net VAT value, region 514 may display information for an input VAT amount, region 516 may display variance information for an output VAT amount, region 518 may display information for VAT in various currencies, region 520 may display variance information for sales and purchases over time, region 522 may display information for a top 5 jurisdictions based on net VAT, region 524 may display information for a top 5 entities based on net VAT, region 526 may display information for a top 5 tax codes, and region 528 may display information regarding a top 5 vendors by VAT.

In an aspect, portions of the information presented in the interface 500 may be flagged based on detected anomalies. For example, values that have risen either up or down by more than a given threshold may be flagged as potential anomalies. A user may click on the flagged data to view information associated with the flagged data in greater detail. For example, upon clicking on the flagged data a pop-up window may be displayed showing information that provides a detailed view of the flagged data. Additionally, information presented in the interface 500 may be annotated to indicate trends (e.g., variances in values above or below a given threshold compared to the previous month may be flagged with arrows that point up or down in accordance with the remainder of the trend). The interface 500 may also provide interactive elements that enable a user to filter the flags that are displayed in the interface 500, such as to show flags for specific types of anomalies but not others, where the set of displayed flags may be modified by interaction with the various interactive elements.

It is noted that the exemplary information shown in and described with reference to the interface 500 of FIG. 5 has been provided for purposes of illustration, rather than by way of limitation and that other types of information may be displayed to present information associated with identified anomalies to users and to enable users to investigate identified anomalies. For example, the interactive elements of the interface of FIG. 5 may enable users to filter the information presented in the interface 500, such as to display certain types of data or not display certain types of data (e.g., display the region 520 or hide it), specify custom or default date ranges for data (e.g., show variance data in the region 510 for a user-specified date range, etc.), custom currency presentations (e.g., a currency for global currency ("Comparison Currency"), currencies for individual documents ("Document CCY"), and/or custom currencies for individual entities and/or VAT Groups that group such entities. Additionally, the interface 500 may be used to display key performance indicator information, group data by tax codes or present information for specific tax codes, grouping data by customer, supplier, vendor, etc., or other controls.

As explained above, the functionality of the interface 500 may enable a user to drill down into transactions associated with any widget on the dashboard (e.g. any of the display regions) to view detailed information on transactions for individual entities, tax codes, top 5 entities, 0-rated transactions, and the like. In an aspect, the interactive elements of the interface 500 may also enable users to customize anomaly detection features, such as to configured a percentage-based threshold (e.g., increases or decreases by "X" percent), a value-based threshold (e.g., to identify up any change above $1 million), or combinations thereof (e.g., identify changes of +20% or $1 M).

In an aspect, additional types of annotations may be provided, such as to provide statistical comparison-based annotations (e.g., whether any given month's VAT position lies within the 90% of what would usually be expected, as may have been predicted by the prediction engine 122 of FIG. 1). As another example, graphical representations may be replaced by or augmented with text-based explanations, which may be dynamically generated. For example, a text-based explanation may indicate that "Between February 2019 and March 2019 the value for 'X' decreased by 'Y' % from 'A' to 'B'". It is noted that in this example the date range may be customized, rather than be limited to months, as described above, and that the types of analysis (e.g., value of "X", decreasing, etc.) may also be customized by the user. It is also noted that various aspects of the interface 500 may be customized in other ways. For example, FIG. 5 shows a comparison of overall net VAT position over time, at region 512, information presented in the interface 500 could be customized to show overall sums, averages, numbers of transactions, or other ways of viewing the data being analyzed. For example, the interface 500 could be used to display information that compares the distribution of all transactions with one tax code from the current month to previous months. It is noted that statistical analysis of distribution variance may uses a Mann-Whitney U test and Kullback-Leibler Divergence, as non-limiting examples.

Figure 6:
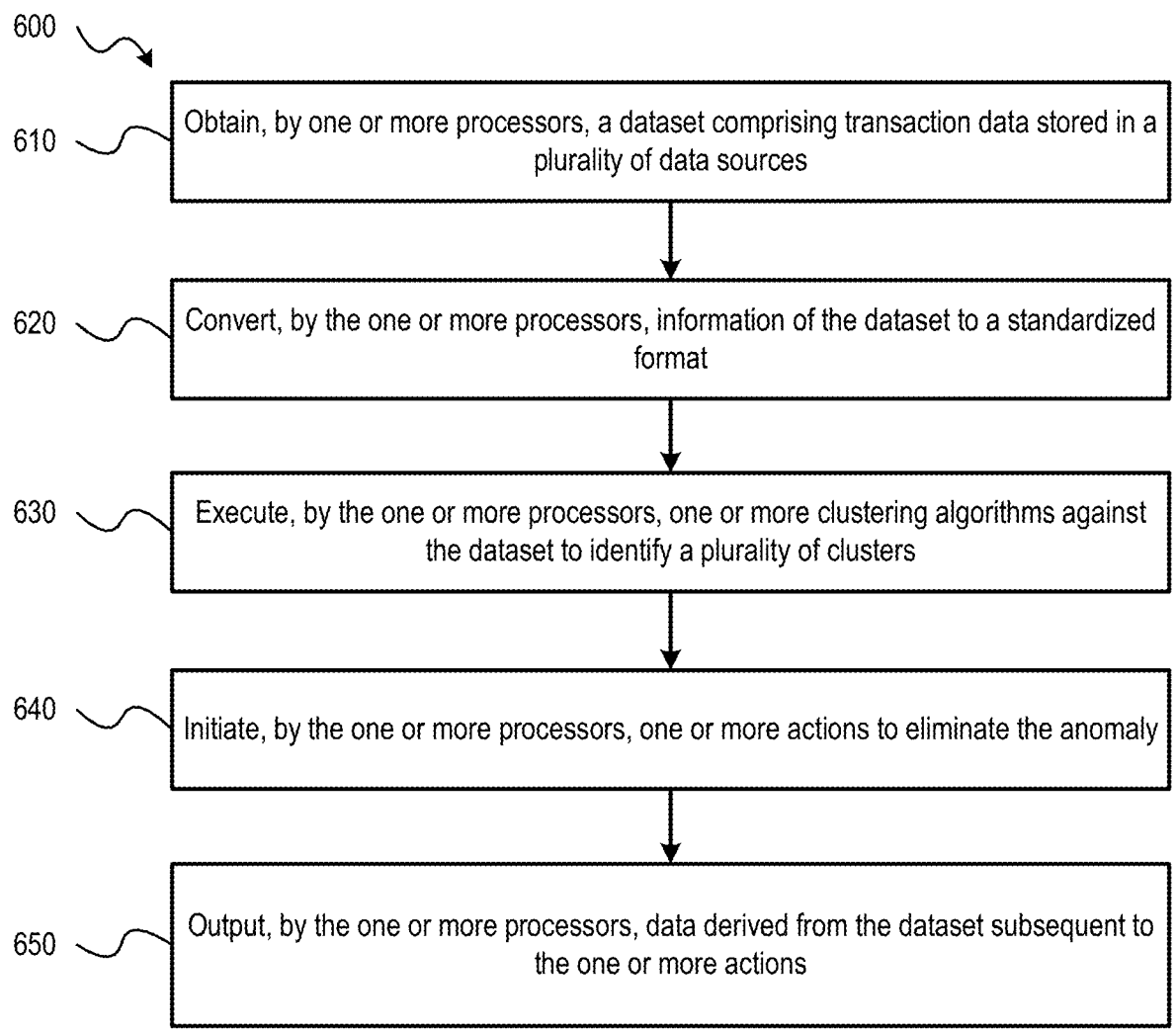
FIG. 6 is a flow diagram of an exemplary method for detecting anomalies in accordance with aspects of the present disclosure is shown.

Referring to FIG. 6, a flow diagram of an exemplary method for detecting anomalies in accordance with aspects of the present disclosure is shown as a method 600.

At step 610, the method 600 includes obtaining, by one or more processors, a dataset comprising transaction data stored in a plurality of data sources. As explained above with reference to FIGS. 1 and 3, the plurality of data sources may store portions of the dataset in a non-standardized format dependent on the hardware and software associated with each data source. At step 620, the method 600 includes converting, by the one or more processors, information of the dataset to a standardized format. In an aspect, the conversion of the data to the standardized format may be performed as described above with reference to FIGS. 1 and 3.

At step 630, the method 600 includes executing, by the one or more processors, one or more clustering algorithms against the dataset to identify a plurality of clusters. As explained above with reference to the anomaly detection engine 120 of FIG. 1, at least one cluster of the plurality of clusters may corresponds to a portion of the dataset comprising an anomaly. In an aspect, step 630 may be performed using multiple clustering algorithms, each clustering algorithm configured to identify a different type of anomaly within the dataset. For example, a first clustering algorithm may be configured to identify anomalies of a first type and a second clustering algorithm may be configured to identify anomalies of a second type. As further described above, additional processes may be performed to detect anomalies, such as variance analysis. Additionally, one or more classification algorithms may be used to determine a cause of the each identified anomaly, as described above. The cause of the identified anomalies may be indicated to a user through one or more warnings, messages, or annotations displayed via a graphical user interface, such as the interface 500 of FIG. 5.

At step 640, the method 600 includes initiating, by the one or more processors, one or more actions to eliminate the anomaly. In an aspect, the one or more actions to eliminate the anomaly may include modifying mapping data between data sources and a report structure, establishing network connectivity with a data source, locating missing data, modifying calculations used to derive data from the one or more data sources, or other actions, as described above with reference to FIGS. 1 and 3-5. At step 650, the method 600 includes outputting, by the one or more processors, data derived from the dataset subsequent to the one or more actions. As described above, the data derived from the dataset subsequent to the one or more actions may include a report generated based on the dataset and/or information derived from the dataset. In an aspect, one or more steps of the method 600 may be performed iteratively. For example, upon detecting anomalies and correcting the cause of the anomalies, the dataset may be re-obtained, at step 610, and any of steps 620-650 may be repeated based on the updated dataset. This process may continue until no anomalies are detected or an acceptable level of anomalies are detected (e.g., anomalies that have minimal impact on the data output at step 650.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-6 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method comprising:
    obtaining, by one or more processors, a dataset comprising transaction data stored in a plurality of data sources, wherein the plurality of data sources store portions of the dataset in a non-standardized format dependent on hardware and software associated with each data source;
    converting, by the one or more processors, information of the dataset to a standardized format;
    executing, by the one or more processors, one or more clustering algorithms against the dataset to generate a plurality of clusters, wherein at least one duster of the plurality of clusters corresponds to a portion of the dataset comprising an anomaly;
    applying a classifier to a portion of the dataset associated with the anomaly, wherein the classifier is configured to determine a cause of the anomaly;
    mapping portions of the dataset to data fields of a report based on mapping data;
    populating the data fields of the report with the mapped portions of the dataset;
    initiating, by the one or more processors, one or more actions to eliminate the anomaly based at least in part on the cause of the anomaly; and
    outputting, by the one or more processors, data derived from the dataset subsequent to the one or more actions, wherein the data derived from the dataset comprises the report.

2. The method of claim 1, wherein the one or more clustering algorithms comprise a plurality of clustering algorithms, each clustering algorithm of the plurality of clustering algorithms is configured to detect at least one type of anomaly within the dataset.

3. The method of claim 1, wherein each clustering algorithm of the plurality of clustering algorithms is configured to detect a different type of anomaly within the dataset.

4. The method of claim 1, further comprising:
    initiating variance analysis with respect to at least a portion of the dataset; and
    determining whether another anomaly is present in the dataset based on the variance analysis.

5. The method of claim 1, further comprising initiating one or more predictions with respect to the dataset, the one or more predictions configured to predict expected values to be derived from a dataset obtained in the future.

6. A system comprising:
    a communication interface communicatively coupled to a plurality of data sources via one or more networks, wherein the plurality of data sources store data in a non-standardized format dependent on hardware and software associated with each data source;
    a memory; and
    one or more processors communicatively coupled to the communication interface and the memory, the one or more processors configured to:
        obtain a dataset comprising transaction data stored in the plurality of data sources;
        convert information of the dataset to a standardized format;
        execute one or more clustering algorithms against the dataset to generate a plurality of clusters, wherein at least one duster of the plurality of clusters corresponds to a portion of the dataset comprising an anomaly;

applying a classifier to a portion of the dataset associated with the anomaly, wherein the classifier is configured to determine a cause of the anomaly;

map portions of the dataset to data fields of a report based on mapping data;

populate the data fields of the report with the mapped portions of the dataset;

initiate one or more actions to eliminate the anomaly based at least in part on the cause of the anomaly; and output data derived from the dataset subsequent to the one or more actions, wherein the data derived from the dataset comprises the report.

7. The system of claim 6, wherein the one or more clustering algorithms comprise a plurality of clustering algorithms, each clustering algorithm of the plurality of clustering algorithms is configured to detect at least one type of anomaly within the dataset.

8. The system of claim 7, wherein each clustering algorithm of the plurality of clustering algorithms is configured to detect a different type of anomaly within the dataset.

9. The system of claim 6, wherein the one or more processors are configured to:

initiate variance analysis with respect to at least a portion of the dataset; and determine whether another anomaly is present in the dataset based on the variance analysis.

10. The system of claim 6, wherein the one or more processors are configured to initiate one or more predictions with respect to the dataset, the one or more predictions configured to predict expected values to be derived from a dataset obtained in the future.

11. A non-transitory computer-readable storage medium storing instructions that, when executed by one or more processors, cause the one or more processors to perform operations comprising:

obtaining a dataset comprising transaction data stored in a plurality of data sources, wherein the plurality of data sources store portions of the dataset in a non-standardized format dependent on hardware and software associated with each data source;

converting, by the one or more processors, information of the dataset to a standardized format;

executing, by the one or more processors, one or more clustering algorithms against the dataset to generate a plurality of clusters, wherein at least one cluster of the plurality of clusters corresponds to a portion of the dataset comprising an anomaly;

applying a classifier to a portion of the dataset associated with the anomaly, wherein the classifier is configured to determine a cause of the anomaly;

mapping portions of the dataset to data fields of a report based on mapping data;

populating the data fields of the report with the mapped portions of the dataset;

initiating, by the one or more processors, one or more actions to eliminate the anomaly based at least in part on the cause of the anomaly; and outputting, by the one or more processors, data derived from the dataset subsequent to the one or more actions, wherein the data derived from the dataset comprises the report.

12. The non-transitory computer-readable storage medium of claim 11, wherein the one or more clustering algorithms comprise a plurality of clustering algorithms, each clustering algorithm of the plurality of clustering algorithms is configured to detect a different type of anomaly within the dataset, wherein the operations comprise:

applying a classifier to a portion of the dataset associated with the anomaly, wherein the classifier is configured to determine a cause of each type of detected anomaly, wherein the one or more actions are determined based at least in part on the cause of each type of detected anomaly output by the classifier.

* * * * *

UNITED STATES PATENT AND TRADEMARK OFFICE
CERTIFICATE OF CORRECTION

Page 1 of 1

PATENT NO. : 12,235,828 B2
APPLICATION NO. : 18/083469
DATED : February 25, 2025
INVENTOR(S) : Johannes Schleith et al.

It is certified that error appears in the above-identified patent and that said Letters Patent is hereby corrected as shown below:

On the Title Page

Item (54), and in the Specification, Column 1, Line 1, delete "SYSTEMS AND METHODS FOR DETECTION AND CORRECTION OF ANOMALIES PRIORITY" and replace with --SYSTEMS AND METHODS FOR DETECTION AND CORRECTION OF ANOMALIES--.

In the Specification

At Column 19, Line number 45, delete "+20%" and replace with --±20%--.

In the Claims

At Column 24, Claim number 1, Line number 18, delete "duster" and replace with --cluster--.
At Column 25, Claim number 6, Line number 1, delete "duster" and replace with --cluster--.

Signed and Sealed this
Eighth Day of April, 2025

Coke Morgan Stewart
*Acting Director of the United States Patent and Trademark Office*